US012720575B2

(12) United States Patent
Mishra et al.

(10) Patent No.: US 12,720,575 B2
(45) Date of Patent: Aug. 25, 2026

(54) MANAGEMENT OF WIRELESS AND WIRED MULTICAST TRAFFIC

(71) Applicant: Fortinet, Inc., Sunnyvale, CA (US)

(72) Inventors: Ruchir Mishra, Sunnyvale, CA (US); Ankur Jain, Bangalore (IN)

(73) Assignee: Fortinet, Inc., Sunnyvale, CA (US)

( * ) Notice: Subject to any disclaimer, the term of this patent is extended or adjusted under 35 U.S.C. 154(b) by 305 days.

(21) Appl. No.: 18/401,593

(22) Filed: Dec. 31, 2023

(65) Prior Publication Data

US 2025/0220693 A1 Jul. 3, 2025

(51) Int. Cl.
*H04W 72/30* (2023.01)
*H04W 76/40* (2018.01)

(52) U.S. Cl.
CPC ........... *H04W 72/30* (2023.01); *H04W 76/40* (2018.02)

(58) Field of Classification Search
CPC .............................. H04W 72/30; H04W 76/40
USPC .......................................................... 370/312
See application file for complete search history.

(56) References Cited

U.S. PATENT DOCUMENTS

2008/0049703 A1* 2/2008 Kneckt ................. H04W 68/00 370/342
2008/0192661 A1* 8/2008 Hamamoto ........... H04L 1/1887 370/310
2019/0261138 A1* 8/2019 Thubert ................ H04L 1/1685
2019/0394056 A1* 12/2019 Xie ....................... H04W 72/30

* cited by examiner

*Primary Examiner* — Chi Tanh P Cheng

(74) *Attorney, Agent, or Firm* — Law Office of Dorian Cartwright; Dorian Cartwright

(57) ABSTRACT

Stations are monitored that join and leave a multicast group associated with one or more switches over a wired channel and one or more access points over a wireless channel. At least one of latency or packet loss over a threshold are detected for a specific VLAN group. Multicast traffic is segregated in response to the detection, at the one or more switches, by reassigning stations that are not associated with multicast traffic to a new VLAN group, and by at the one or more access points, reassigning stations that are associated with multicast traffic with the low bandwidth frequency and reassigning stations that are not associated with multicast traffic with the high bandwidth frequency.

4 Claims, 6 Drawing Sheets

WI-FI CONTROLLER
110

Station Monitoring Module
210

CAM Module
220

Multicast Segregation Module
230

| CAM Table (Wi-Fi Controller 110) | | | | | | | | 310E |
|---|---|---|---|---|---|---|---|---|
| | 310B | | | 310C | | | 310D | THRESHOLD |
| 310A | MULTICAST? | STA MAC | STA IP | VLANS | SWITCH IP | AP IP | AP FREQ | EXCEEDED? |
| STA 1 | Y | | | 1 | | | 6G | Y |
| STA 2 | Y | | | 1 | | | 6G | Y |
| STA 3 | Y | | | 2 | | | 5G | Y |
| STA 4 | Y | | | 2 | | | 5G | Y |
| STA 5 | N | | | 3 | | | 2.4G | N |
| STA 6 | N | | | 3 | | | 2.4G | N |
| STA 7 | N | | | 3 | | | 2.4G | N |
| STA 8 | N | | | 3 | | | 2.4G | N |

*FIG. 3*

MANAGEMENT OF WIRELESS AND WIRED MULTICAST TRAFFIC

FIELD OF THE INVENTION

The invention relates generally to computer networks, and more specifically, for proactively segregating multicast traffic across both wired and wired data traffic to proactively manage adverse effects.

BACKGROUND

The basic idea behind multicast networking is that a single packet can be delivered by a server and received by several receivers. Multicast packets are only received by receivers that desire them, unlike broadcast packets, which are received by all receivers within a specific network segment (or broadcast domain). Additionally, multicast receivers may be dispersed across a bigger network using routers.

Problematically, multicast packets can lead to significant on the performance and connectivity of clients connected to the network. When wireless airtime utilization is high, it can lead to congestion and interference on the network, which can result in slower data transfer rates and a degraded user experience.

What is needed is a robust technique for proactively segregating multicast traffic across both wired and wired data traffic to proactively manage adverse effects.

SUMMARY

To meet the above-described needs, methods, computer program products, and systems for proactively segregating multicast traffic across both wired and wired data traffic to proactively manage adverse effects c.

In one embodiment, stations are monitored that join and leave a multicast group associated with one or more switches over a wired channel and one or more access points over a wireless channel (can be in coordination with routers). The one or more switches have IGMP-snooping enabled and the one or more access points transmit over multiple frequencies, comprising at least a high bandwidth frequency and a low bandwidth frequency. A CAM (Content Addressable Memory) can be populated with data provided from the one or more switches and from the one or more access points, with stations and a VLAN group associated with each station.

In another embodiment, at least one of latency or packet loss over a threshold are detected for a specific VLAN group. Multicast traffic is segregated in response to the detection, at the one or more switches, by reassigning stations that are not associated with multicast traffic to a new VLAN group, and by at the one or more access points, reassigning stations that are associated with multicast traffic with the lower bandwidth frequency and reassigning stations that are not associated with multicast traffic with the higher bandwidth frequency. Other embodiments can have a different algorithm.

Advantageously, network performance is improved with less packet loss.

BRIEF DESCRIPTION OF THE DRAWINGS

In the following drawings, like reference numbers are used to refer to like elements. Although the following figures depict various examples of the invention, the invention is not limited to the examples depicted in the figures.

Figure 2:
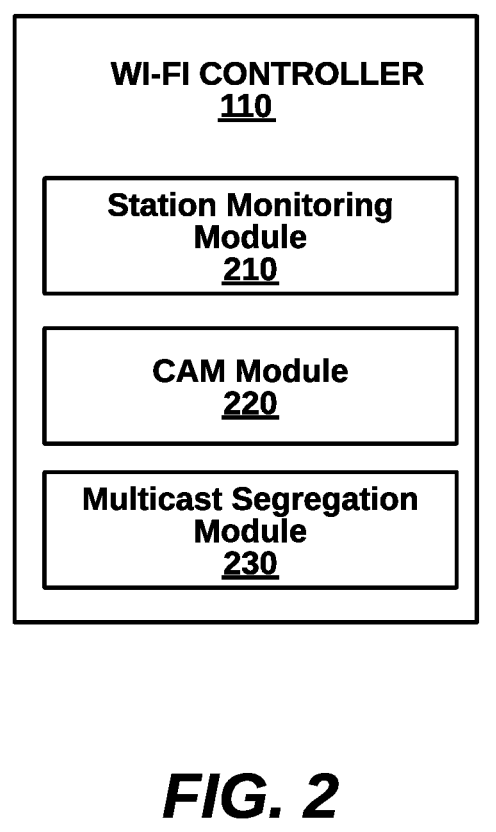

FIG. 2 is a more detailed block diagram illustrating a Wi-Fi controller of the system of FIG. 1, according to one embodiment.

FIG. 3 is an example CAM table, according to one embodiment.

DETAILED DESCRIPTION

Methods, computer program products, and systems for proactively segregating multicast traffic across both wired and wired data traffic to proactively manage adverse effects. The following disclosure is limited only for the purpose of conciseness, as one of ordinary skill in the art will recognize additional embodiments given the ones described herein.

I. Systems for Multicast Traffic Management (FIGS. 1-3)

Figure 1:
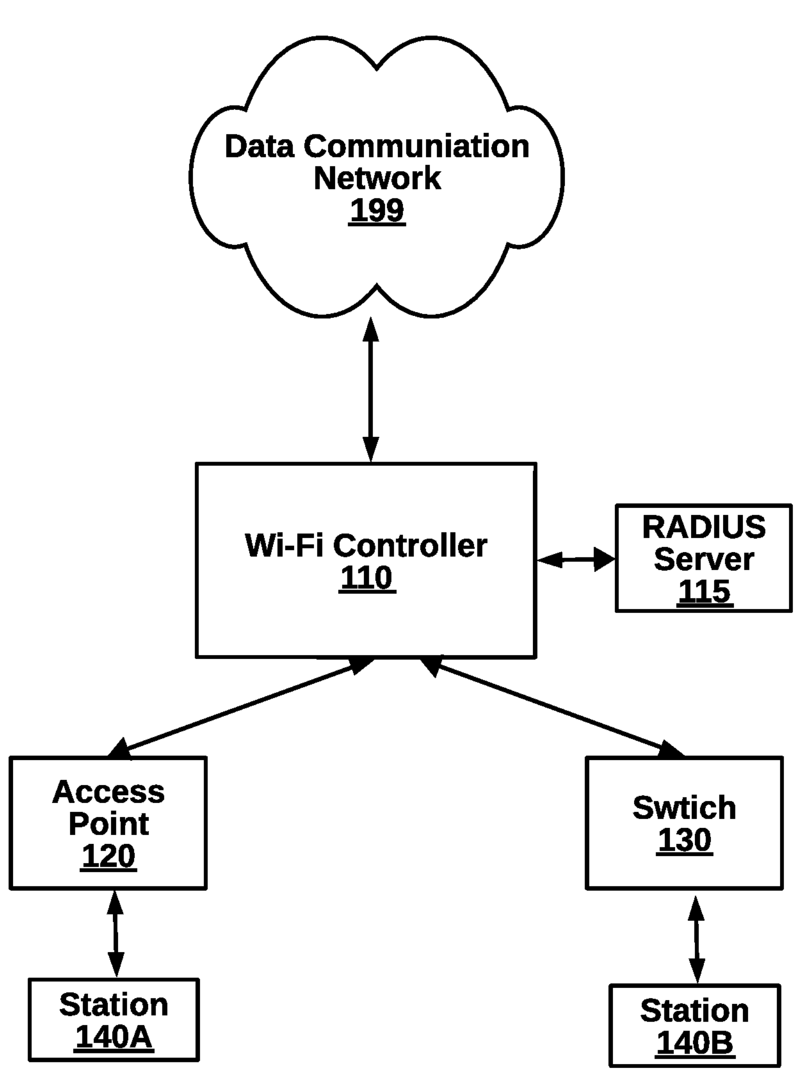
FIG. 1 is a high-level block diagram illustrating aspects of a system for proactively segregating multicast traffic across both wired and wired data traffic to proactively manage adverse effects, according to some embodiments.
Figure 6:
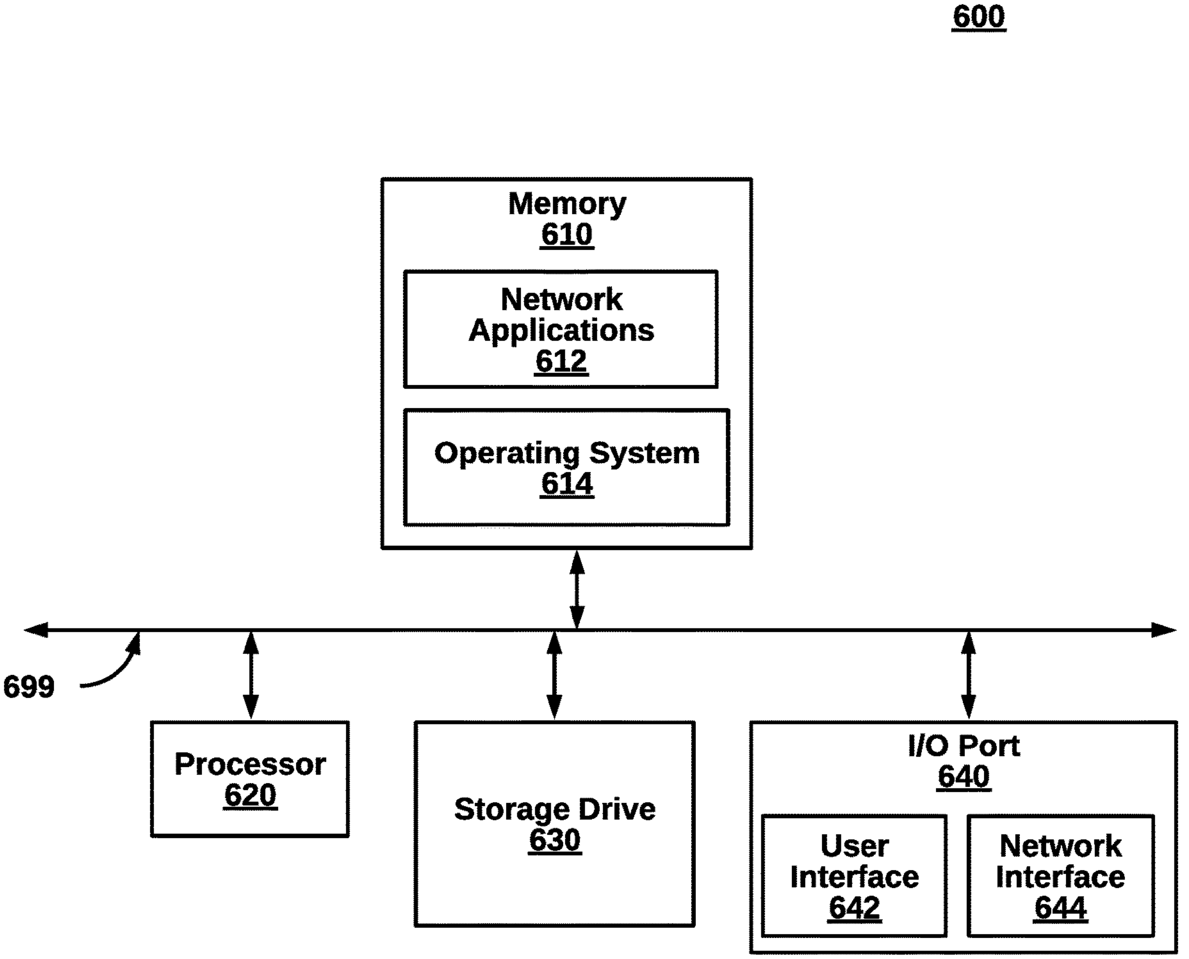
FIG. 6 is a block diagram illustrating an example computing device for the system of FIG. 1, according to one embodiment.

FIG. 1 is a high-level block diagrams illustrating a system 100 for proactively segregating multicast traffic across both wired and wired data traffic to proactively manage adverse effects, according to an embodiment. The system 100 includes a Wi-Fi controller 110, Wi-Fi access point 120, a switch 130 and stations 140A, B. Other embodiments of the system 100 can include additional components that are not shown in FIG. 1, such as routers, switches, network gateways, and firewalls, as well as additional access points and stations are also possible. For example, the system 100 of FIG. 1 shows one access point, one switch and two stations, however, other examples have hundreds of stations connected to multiple access points and switches distributed over different LANs. The components of system 100 can be implemented in hardware, software, or a combination of both. An example implementation is shown in FIG. 6.

In one embodiment, the components of the system 100 are coupled in communication over a private network connected to a public network, such as the Internet. In another embodiment, system 100 is an isolated, private network, or alternatively, a set of geographically dispersed LANs. The components can be connected to the data communication system 199 via hard wire (e.g., Wi-Fi controller 110, access point 120). The components can also be connected via wireless networking (e.g., stations 140A, B). The data communication network 199 can be composed of any combination of hybrid networks, such as an SDWAN, an SDN (Software Defined Network), WAN, a LAN, a WLAN, a Wi-Fi network, a cellular network (e.g., 3G, 4G, 5G or 6G), or a hybrid of different types of networks. Various data protocols can dictate format for the data packets. For example, Wi-Fi data packets can be formatted according to IEEE 802.11, IEEE 802.11r, 802.11be, Wi-Fi 6, Wi-Fi 6E, Wi-Fi 7 and the like. Components can use IPV4 or IPV6 address spaces.

1. Dynamically increasing and decreasing the multicast-traffic data-rates in sequential (data-rates) steps gives the advantage to adapt to varying network-conditions based on channel-utilization. In a situation of high channel-utilization on access point operating channel, transmission of multicast traffic is moved to higher-data-rates (12 or 24 Mbps) so that congestion and contention on lower-data-rates can be reduced. Also, this prevents impact on unicast traffic (6 Mbps) and saves clients from dropping connections and hence enhancing system-performance.

Once the channel conditions or utilization are back to normal with reduced PPS, the MC-traffic rates are readjusted gradually to increase the packets-reachability to all clients.

2. The system 100 can take into account the access category of multicast traffic while adjusting the data-rates. For example, voice and video multicast traffic will be allocated higher-data-rates (24 Mbps) for more secure transmission; compared to Best-Effort & Background MC-traffic (12 Mbps). As a result, end-user experience is enhanced.
3. Categorization of the clients dynamically based on multicast traffic to different radios/channels to provide the best performance to all clients.
4. The system 100 can address multicast-traffic issues for both wired (Ethernet) and Wireless (802.11 WLAN) traffic.

One non-limiting embodiment of the system 100 in operation is described as providing dual A. wired multicast management and B. wireless multicast management.

A. Multicast Traffic Degrading Wired Networks. One problem is that multicast traffic causes flooding havoc in wired networks. Multicast traffic is used by many devices to advertise and find services on the network. Simple tasks like streaming to an Apple TV or connecting to a printer are made possible by protocols like Bonjour and MDNS, but that simplicity has a price. This traffic might slow down a wireless network if there are too many connected devices transmitting it. Each device on a wired network has a full-duplex connection typically at gigabit speed to its switch port. This bandwidth is not shared by any other devices. Switch support for hardware forwarding status information can be used to forward multicast frames into a Wi-Fi enabled area.

However, because the widespread use of multicast in IPV6, stations with an IPV6 address will need state on the switch for numerous solicited-node multicast addresses, possibly many. Frames flood all of the switch ports for multicast addresses that do not have forwarding state installed, due to memory limitations and the like. When the access point lengthens the cable segment, wired multicast also affects wireless LANs because multicast/broadcast frames on the wired LAN side are replicated to the wireless LAN (WLAN).

In an embodiment, the Wi-Fi controller 110 preemptively manages multicast traffic by segmenting from unicast traffic under certain conditions, such as high latency or dropped packet rates. Switch 120 dynamically builds and maintains a CAM table, holding all of the necessary MAC information for each port. The RADIUS server 115 can provide RADIUS-dynamic VLAN allocation. The access points 120 can be aware of multicast group members leaving and joining multicast groups. This information can be transmitted upstream to the Wi-Fi controller 110 for decisions.

In one example, separate VLANs for students (VLAN ID: 1, 2); teachers (VLAN ID: 3,4), admin (VLAN ID: 5, 6) and guests (VLAN ID: 7,8). In general, VLANs operate to logically break a switch into multiple, unconnected switches. There may be no traffic between VLANs (layer 2), except through a router (layer 3). Since, both VLANs are part of same user group broadcast announcements frames for ARP, DHCP etc. will be listened across both VLANs.

With the above configuration, each network user group (students, teachers, admin and guests) can have two VLANs allocated. The network devices (including access points and switches) continuously monitoring of stations (MAC addresses) which are joining/leaving a multicast group with a dynamic network monitoring over a period of time, both access point and switches (with IGMP-snooping enabled) will populate a list of wired and wireless devices which are a part of a specific multicast group (e.g., one Apple TV and few iPads). In one embodiment, a CAM table is maintained. The above-generated list will be periodically sent to Wi-Fi controller 110 to make a judgement if multicast group creation is adversely affecting wired-network congestion or not. From the ingress & egress frame count for multicast sources/destinations, switches and access point can easily determine the wired/wireless station MAC address which are members of a multicast group.

Ethernet technology for local area networking makes use of the medium access control (MAC) technique known as carrier-sense multiple access with collision detection (CSMA/CD). To delay transmissions until no other stations are transmitting, it employs carrier sensing. This is combined with collision detection, in which a transmitting station senses broadcasts from other stations while it is broadcasting a frame in order to detect collisions. The stations 140A, B pause transmitting that frame when this collision condition is discovered, sends a jam signal, and then waits for a random amount of time before attempting to resend the frame.

Hence, with the following parameters—1. CAM table, 2. CSMA/CD at access points and switches Ethernet ports, 3. Wireless medium contention i.e., retry count from the wireless-clients on access points reporting multicast group Tx-Rx frame counts, and 4. lower operating data rates of clients—the Wi-Fi Controller 110 will make a well-informed decision that the multicast traffic from one or multiple multicast groups in particular VLANS (VLAN ID: 1, 3, 5, 7) is the cause of latency on the wired-backend-network casing overall sluggishness for both wired clients and other wireless clients running unicast DL/UL traffic with the access points.

With the decision made in the above-step, the Wi-Fi controller 110 then instructs the authentication-sever with dynamic (multiple) VLANs configured per user group to allocate a new VLAN ID: 2, 4, 6, 8 to those devices which are not a part of part of any multicast group and/or sending/receiving UC-traffic. This VLAN reassignment would certainly lead to a L3 reconnection. Then stations can get IP address from new VLAN and both access points and switches can update their ARP and IGMP-snooping tables, but an L2 reconnection can be avoided as user-group for authentication and credentials remain the same.

This dynamic segregation of multicast traffic to be restricted to a specific VLAN and keeping the users which are not a part of any multicast group in a separate VLAN, will drastically improve wired-network conditions preventing network flooding as all multicast traffic will be restricted to one specific VLAN only. The users (part of a user-group) will be dynamically switched between VLANs based on their, being a part of multicast sender/receiver group or not. Since both the VLANS will be part of same user-group (e.g., students, teachers, admin, guests) their access-rights (pertaining to individual firewall-policies) remain constant causing no service disruptions for the users.

B. Multicast Traffic Degrading Wireless Networks.

Wi-Fi is more like the hub, the switch's forerunner. All of the devices linked to a hub get packets. The traffic from one port affected all of the devices on the other ports, and the devices share a collision domain. In Wi-Fi, any device running on a channel (frequency) has an impact on every other device operating on the same channel. Multicast data is handled differently from unicast data over Wi-Fi, in addition to using the same amount of capacity. The access point can transmit the multicast traffic at a legacy data rate in order to guarantee that every device connected to the SSID receives it.

The initial 802.11abg speeds of 1, 2, 5.5, 6, 9, 11, 12, 18, 24, 36, 48, and 54 Mbps are considered the legacy data rates. These speeds pale in comparison to the faster ones offered by 802.11n (high-throughput rates) and 802.11ac (very high-throughput rates). This reduces the amount of bandwidth available to other users and raises channel contention.

However, this action is required by the 802.11 standard in order to support backwards compatibility. These lower-order modulation transmissions take up more space in the medium and interfere with the efficient delivery of traffic to neighboring stations utilizing higher-order modulations.

Since multicast packets do not contain ACKs, access points cannot determine whether a resend is necessary. This trait frequently results in unacceptably high error rates, even with wired Internet. Wireless links are in a considerably worse state and are more susceptible to the presence of background traffic. Because of the lack of retransmission and the sender's unwillingness to back off, there may consequently be a high packet error rate (PER). PER is the ratio, in percent, of the number of packets not successfully received by the device.

The Wi-Fi controller 110 can dynamically steer wireless clients from 6G to 5G, from 5G to 2.4G, and the like, based on count and volume of multicast traffic senders and receivers at a given point in time. In one case, multicast stations are steered to lower bandwidth frequencies while non-multicast stations are steered to higher bandwidth frequencies, and are no longer interrupted by multicast disarray. In a situation wherein multicast traffic delivery needs priority delivery (and in the absence of unicast traffic), e.g., a teacher and classroom environment, where a teacher's screen is shared across multiple student's screen. Multicast traffic can be steered to higher frequency bands. In another embodiment, multicast traffic can also be steered to lower frequency band when unicast traffic delivery needs prioritization, e.g., voice call.

The Wi-Fi access point 120 monitors multicast traffic and coordinate with the Wi-Fi controller for resulting adjustments. The stations 140A, B can run applications that generate and receive multicast traffic.

FIG. 2 is a more detailed block diagram illustrating the Wi-Fi controller 110 of the system of FIG. 1, according to one embodiment. The Wi-Fi controller 110 includes a station monitoring module 210, a CAM module 220 and a multicast segregation module 230. The components can be implemented in hardware, software, or a combination of both.

The station monitoring module 210 monitors stations that join and leave a multicast group associated with one or more switches over a wired channel and one or more access points over a wireless channel, wherein the one or more switches have IGMP-snooping enabled and the one or more access points transmit over multiple frequencies, comprising at least a high bandwidth frequency and a low bandwidth frequency.

The CAM module 220 can populate a CAM table, with data provided from the one or more switches and from the one or more access points, with stations and a VLAN group associated with each station. In one case, by sending an IGMP membership report message to the group IP address, a device can join a group. A multicast router on the segment receives this packet and takes the appropriate action to begin sending the data stream to this device. IGMP-snooping is an essential Layer 2 IGMP add-on. A Layer 2 device, such as an Ethernet switch, listens to IGMP membership reports when IGMP Snooping is enabled. The switch can then make use of this knowledge to make sure that, as opposed to all devices on the segment, only those devices that truly desire to receive this multicast group receive the data. The switch additionally intercepts the membership reports in various IGMP Snooping implementations and maintains track of which groups are necessary on each VLAN. It can take on the role of a proxy querier on behalf of the VLAN, obtaining the necessary groups and only sending them to the appropriate end devices. A leave IGMP report can be sent up to the multicast router to instruct it to stop forwarding this group. At the same time, it can maintain note of when no devices on the segment are still interested in each group.

One example CAM table 300 is shown in FIG. 3. All stations are listed in column 310A, whether or not they are multicast (as determined by IGMP-snooping switch or access point) in column 310B, an assigned VLAN (or VLANS) in column 310C, an assigned access point frequency in column 310D and whether or not a threshold has been exceeded in column 310E. The threshold is an identification by the Wi-Fi controller 110 that a particular station is associated with a high latency or packet loss. As a result, VLANS can be adjusted according to the presence of multicast traffic. Many different examples are possible.

The multicast segregation module 230 can detecting at least one of latency or packet loss over a threshold for a specific VLAN group. In response, multicast traffic is segregated in response to the detection, at the one or more switches, by reassigning stations that are not associated with multicast traffic to a new VLAN group, and by at the one or more access points, reassigning stations that are associated with multicast traffic with the high bandwidth frequency and reassigning stations that are not associated with multicast traffic with the low bandwidth frequency.

II. Methods for Multicast Traffic Management (FIGS. 4-5)

Figure 4:
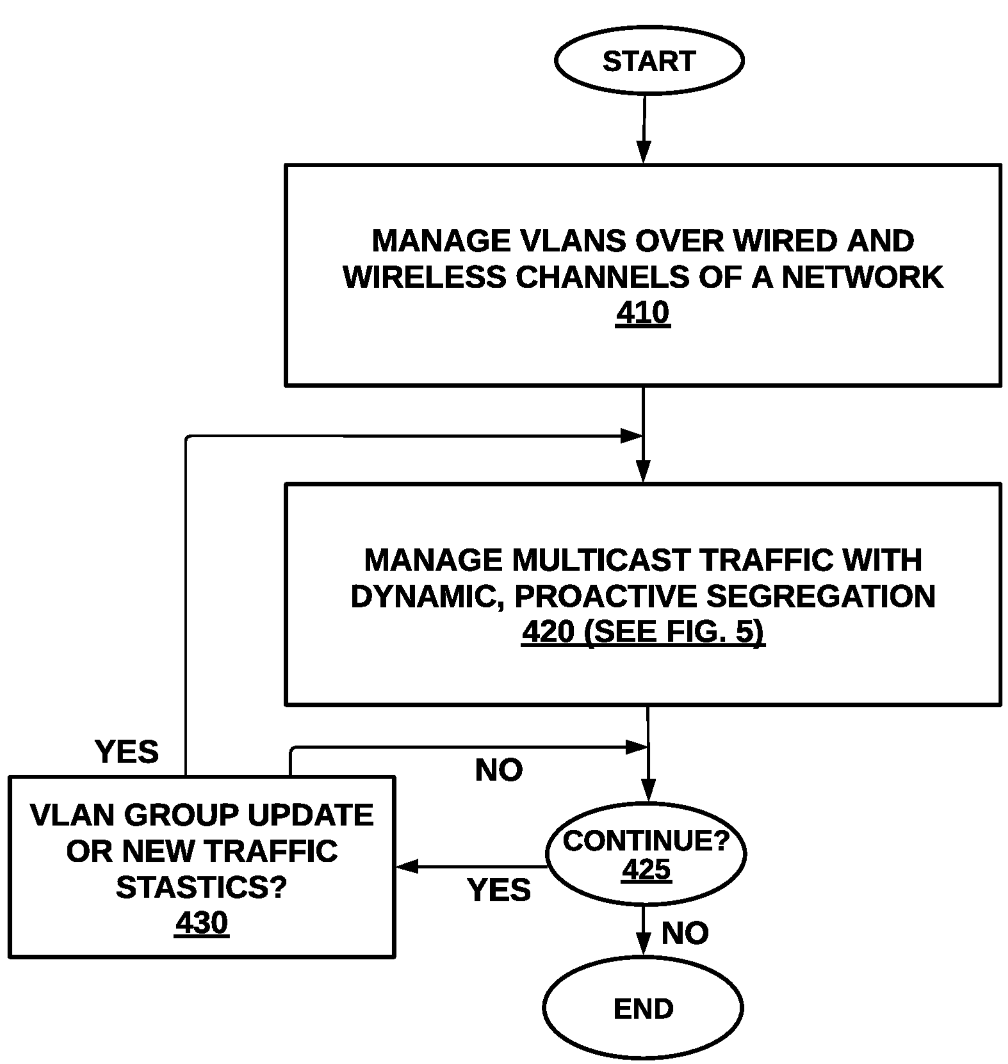
FIG. 4 is a high-level flow diagram illustrating a method for managing multicast traffic, according to an embodiment.

FIG. 4 is a high-level flow diagram of a method 400 for managing multicast traffic, according to an embodiment. The method 400 can be implemented by, for example, system 100 of FIG. 1. The specific grouping of functionalities and order of steps are a mere example as many other variations of method 400 are possible, within the spirit of the present disclosure.

Specifically, at step 410, a Wi-Fi controller manages VLANs over wire and wireless channels of a network. At step 420, multicast traffic in VLANS is managed by dynamic, proactive segregation, as described in more detail in association with FIG. 5. At steps 425 and 430, responsive to an VLAN group update or new traffic statistics, the segregation process can be repeated.

Figure 5:
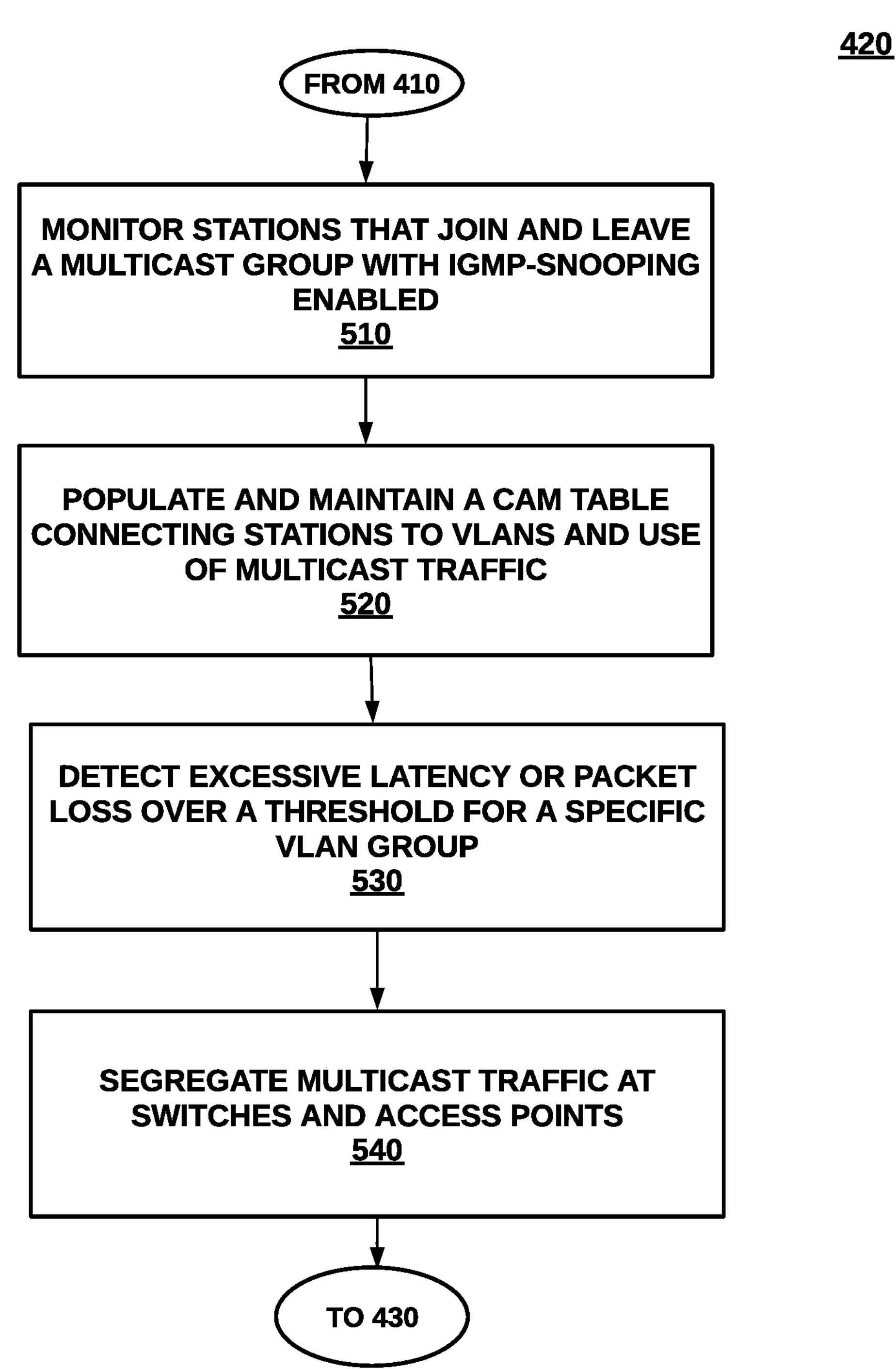
FIG. 5 is a more detailed flow diagram illustrating a step for dynamic, proactive segregation across both wired and wireless traffic with VLAN groups, from the method of FIG. 4, according to one embodiment.

FIG. 5 is a more detailed flow diagram detailing the step 420 of dynamically and proactively segregating multicast traffic across both wired and wired data traffic. Other variations are possible for different implementations.

At step 510, monitoring stations that join and leave a multicast group associated with one or more switches over a wired channel and one or more access points over a wireless channel. The one or more switches have IGMP-snooping enabled and the one or more access points transmit over multiple frequencies, comprising at least a high bandwidth frequency and a low bandwidth frequency.

At step 520, populating a CAM, with data provided from the one or more switches and from the one or more access points, with stations and a VLAN group associated with each station.

At step 530, detecting at least one of latency or packet loss over a threshold for a specific VLAN group.

At step 540, segregating multicast traffic in response to the detection, at the one or more switches, by reassigning stations that are not associated with multicast traffic to a new VLAN group, and by at the one or more access points, reassigning stations that are associated with multicast traffic with the low bandwidth frequency and reassigning stations that are not associated with multicast traffic with the high bandwidth frequency.

III. Computing Device for Multicast Traffic Management (FIG. 6)

FIG. 6 is a block diagram illustrating a computing device 600 for use in the system 100 of FIG. 1, according to one embodiment. The computing device 600 is a non-limiting example device for implementing each of the components of the system 100, including the Wi-Fi controller 110, the RADIUS server 115, the access point 120, and the stations 140A, B. Additionally, the computing device 600 is merely an example implementation itself, since the system 100 can also be fully or partially implemented with laptop computers, tablet computers, smart cell phones, Internet access applications, and the like.

The computing device 600, of the present embodiment, includes a memory 610, a processor 620, a hard drive 630, and an I/O port 640. Each of the components is coupled for electronic communication via a bus 650. Communication can be digital and/or analog, and use any suitable protocol.

The memory 610 further comprises network access applications 612 and an operating system 614. Network access applications can include 612 a web browser, a mobile access application, an access application that uses networking, a remote access application executing locally, a network protocol access application, a network management access application, a network routing access applications, or the like.

The operating system 614 can be one of the Microsoft Windows® family of operating systems (e.g., Windows 98, 98, Me, Windows NT, Windows 2000, Windows XP, Windows XP x84 Edition, Windows Vista, Windows CE, Windows Mobile, Windows 7 or Windows 8), Linux, HP-UX, UNIX, Sun OS, Solaris, Mac OS X, Alpha OS, AIX, IRIX32, or IRIX84. Other operating systems may be used. Microsoft Windows is a trademark of Microsoft Corporation.

The processor 620 can be a network processor (e.g., optimized for IEEE 802.11), a general purpose processor, an access application-specific integrated circuit (ASIC), a field programmable gate array (FPGA), a reduced instruction set controller (RISC) processor, an integrated circuit, or the like. Qualcomm Atheros, Broadcom Corporation, and Marvell Semiconductors manufacture processors that are optimized for IEEE 802.11 devices. The processor 620 can be single core, multiple core, or include more than one processing elements. The processor 620 can be disposed on silicon or any other suitable material. The processor 620 can receive and execute instructions and data stored in the memory 610 or the hard drive 630.

The storage device 630 can be any non-volatile type of storage such as a magnetic disc, EEPROM, Flash, or the like. The storage device 630 stores code and data for access applications.

The I/O port 640 further comprises a user interface 642 and a network interface 644. The user interface 642 can output to a display device and receive input from, for example, a keyboard. The network interface 644 connects to a medium such as Ethernet or Wi-Fi for data input and output. In one embodiment, the network interface 644 includes IEEE 802.11 antennae.

Many of the functionalities described herein can be implemented with computer software, computer hardware, or a combination.

Computer software products (e.g., non-transitory computer products storing source code) may be written in any of various suitable programming languages, such as C, C++, C#, Oracle® Java, JavaScript, PHP, Python, Perl, Ruby, AJAX, and Adobe® Flash®. The computer software product may be an independent access point with data input and data display modules. Alternatively, the computer software products may be classes that are instantiated as distributed objects. The computer software products may also be component software such as Java Beans (from Sun Microsystems) or Enterprise Java Beans (EJB from Sun Microsystems).

Furthermore, the computer that is running the previously mentioned computer software may be connected to a network and may interface to other computers using this network. The network may be on an intranet or the Internet, among others. The network may be a wired network (e.g., using copper), telephone network, packet network, an optical network (e.g., using optical fiber), or a wireless network, or any combination of these. For example, data and other information may be passed between the computer and components (or steps) of a system of the invention using a wireless network using a protocol such as Wi-Fi (IEEE standards 802.11, 802.11a, 802.11b, 802.11e, 802.11g, 802.11i, 802.11n, and 802.ac, just to name a few examples). For example, signals from a computer may be transferred, at least in part, wirelessly to components or other computers.

In an embodiment, with a Web browser executing on a computer workstation system, a user accesses a system on the World Wide Web (WWW) through a network such as the Internet. The Web browser is used to download web pages or other content in various formats including HTML, XML, text, PDF, and postscript, and may be used to upload information to other parts of the system. The Web browser may use uniform resource identifiers (URLs) to identify resources on the Web and hypertext transfer protocol (HTTP) in transferring files on the Web.

The phrase "network appliance" generally refers to a specialized or dedicated device for use on a network in virtual or physical form. Some network appliances are implemented as general-purpose computers with appropriate software configured for the particular functions to be provided by the network appliance; others include custom hardware (e.g., one or more custom Application Specific Integrated Circuits (ASICs)). Examples of functionality that may be provided by a network appliance include, but is not limited to, layer 2/3 routing, content inspection, content filtering, firewall, traffic shaping, application control, Voice over Internet Protocol (VOIP) support, Virtual Private Networking (VPN), IP security (IPSec), Secure Sockets Layer (SSL), antivirus, intrusion detection, intrusion prevention, Web content filtering, spyware prevention and anti-spam. Examples of network appliances include, but are not limited to, network gateways and network security appliances (e.g., FORTIGATE family of network security appliances and FORTICARRIER family of consolidated security appliances), messaging security appliances (e.g., FORTIMAIL family of messaging security appliances), database security and/or compliance appliances (e.g., FORTIDB database security and compliance appliance), web application firewall appliances (e.g., FORTIWEB family of web application firewall appliances), application acceleration appliances, server load balancing appliances (e.g., FORTIBALANCER family of application delivery controllers), vulnerability management appliances (e.g., FORTISCAN family of vulnerability management appliances), configuration, provisioning, update and/or management appliances (e.g., FORTIMANAGER family of management appliances), logging, analyzing and/or reporting appliances (e.g., FORTIANALYZER family of network security reporting appliances), bypass appliances (e.g., FORTIBRIDGE family of bypass appliances), Domain Name Server (DNS) appliances (e.g., FORTIDNS family of DNS appliances), wireless security appliances (e.g., FORTI Wi-Fi family of wireless security gateways), FORIDDOS, wireless access point appliances (e.g., FORTIAP wireless access points), switches (e.g., FORTISWITCH family of switches) and IP-PBX phone system appliances (e.g., FORTIVOICE family of IP-PBX phone systems).

This description of the invention has been presented for the purposes of illustration and description. It is not intended to be exhaustive or to limit the invention to the precise form described, and many modifications and variations are possible in light of the teaching above. The embodiments were chosen and described in order to best explain the principles of the invention and its practical access applications. This description will enable others skilled in the art to best utilize and practice the invention in various embodiments and with various modifications as are suited to a particular use. The scope of the invention is defined by the following claims.

We claim:

1. A computer-implemented method in a Wi-Fi controller on a data communication network, for proactively segregating multicast traffic across both wired and wired data traffic to proactively manage adverse effects, the method comprising:

monitoring stations that join and leave a multicast group associated with one or more switches over a wired channel and one or more access points over a wireless channel, wherein the one or more switches have IGMP-snooping enabled and the one or more access points transmit over multiple frequencies, comprising at least a high bandwidth frequency and a low bandwidth frequency;

populating a CAM (Content Addressable Memory), with data provided from the one or more switches and from the one or more access points, with the monitored stations and a respective VLAN group associated with each monitored station;

detecting at least one of latency or packet loss over a threshold for a specific VLAN group; and segregating multicast traffic in response to the detection, at the one or more switches, by reassigning that are not associated with multicast traffic to a new VLAN group, and at the one or more access points, by reassigning the monitored stations that are associated with multicast traffic with the low bandwidth frequency and reassigning the monitored stations that are not associated with multicast traffic with the high bandwidth frequency.

2. The method of claim 1, wherein the multicast traffic comprises IPV6 traffic.

3. A non-transitory computer-readable medium in a Wi-Fi controller on a data communication network, for proactively segregating multicast traffic across both wired and wired data traffic to proactively manage adverse effects, the method comprising:

monitoring stations that join and leave a multicast group associated with one or more switches over a wired channel and one or more access points over a wireless channel, wherein the one or more switches have IGMP-snooping enabled and the one or more access points transmit over multiple frequencies, comprising at least a high bandwidth frequency and a low bandwidth frequency;

populating a CAM (Content Addressable Memory), with data provided from the one or more switches and from the one or more access points, with the monitored stations and a respective VLAN group associated with each monitored station;

detecting at least one of latency or packet loss over a threshold for a specific VLAN group; and segregating multicast traffic in response to the detection, at the one or more switches, by reassigning that are not associated with multicast traffic to a new VLAN group, and at the one or more access points, by reassigning the monitored stations that are associated with multicast traffic with the low bandwidth frequency and reassigning the monitored stations that are not associated with multicast traffic with the high bandwidth frequency.

4. A Wi-Fi controller on a data communication network, for proactively segregating multicast traffic across both wired and wired data traffic to proactively manage adverse effects, the Wi-Fi controller comprising:

a processor;

a network interface communicatively coupled to the processor and to a data communication network; and a memory, communicatively coupled to the processor and storing instructions that when executed by the processor:

join and leave a multicast group associated with one or more switches over a wired channel and one or more access points over a wireless channel, wherein the one or more switches have IGMP-snooping enabled and the one or more access points transmit over multiple frequencies, comprising at least a high bandwidth frequency and a low bandwidth frequency;

populate a CAM (Content Addressable Memory), with data provided from the one or more switches and from the one or more access points, with the monitored stations and a respective VLAN group associated with each monitored station;

detect at least one of latency or packet loss over a threshold for a specific VLAN group; and segregate multicast traffic in response to the detection, at the one or more switches, by reassigning that are not associated with multicast traffic to a new VLAN group, and at the one or more access points, by reassigning the monitored stations that are associated with multicast traffic with the low bandwidth frequency and reassigning the monitored stations that are not associated with multicast traffic with the high bandwidth frequency.

* * * * *